Patented Jan. 8, 1946

2,392,302

UNITED STATES PATENT OFFICE 2,392,302

DISPERSIBLE SOYA COMPOSITIONS

Chester L. Baker, Narberth, and Robert H. Sams, Upper Darby, Pa., assignors to Philadelphia Quartz Company, Philadelphia, Pa., a corporation of Pennsylvania No Drawing. Application May 15, 1943, Serial No. 487,184

1 Claim. (Cl. 106—154)

This invention relates to dispersible soya compositions; and it includes compositions of matter comprising soyabean flour impregnated with a quantity of a water-soluble, liquid preserving-dispersing agent, usually ranging in amount from about 0.1 to 5 per cent by weight, sufficient to enable the flour to be readily dispersed when mixed with water and a finely-divided mineral weighting agent, which may be a coloring matter, serving to weigh down the flour when first mixed with water, thereby increasing its dispersibility and tending to increase the stability of the resulting dispersions; said composition also usually containing water up to about 45 per cent, the quantity of preserving-dispersing agent and water present being sufficient to prevent segregation of the components of said composition when in dry form; all as more fully hereinafter set forth and as claimed.

While all vegetable seed flours are rather difficult to disperse in water, owing to their non-wetting characteristics, soya flour is quite outstanding in this respect, which may be due to its oiliness and low specific gravity. Soya flour finds use in a number of industrial applications in which it must be dispersed in water and in these cases its non-dispersing and water-repelling characteristics are highly objectionable. Another difficulty with the industrial use of soya flour is that it is attractive to many types of vermin. And when damp it forms an excellent nutrient medium for molds and bacteria.

We have found that the non-dispersing and water-repelling properties of soya flour can be obviated and its attractiveness to vermin eliminated by admixing this flour with what may be termed a weighting agent and a liquid preserving-dispersing agent, sufficient water being present to act, in combination with the preserving-dispersing agent, to prevent segregation of the components of the mixture. Any of the preserving-dispersing agents, which have vermin-repelling properties and are compatible with soyabean flour and especially those which are at least slightly soluble in both oil and water, can be employed. The resulting flour mixture has lost its objectionable dustiness. It can be stored, even though containing up to 45 per cent of water, without danger of attack from vermin and without molding. And it can be quickly dispersed in water with a substantial saving in time and power. The resulting dispersions are more homogeneous and more stable. And they make better products, such as adhesives, for example.

The weighting agent may take the form of any finely divided mineral which is substantially heavier than water. If it is desired to color the treated flour distinctively, this weighting agent may take the form of a colored pigment, for example. The weighting agent assists in dispersing the soya flour since it reduces its tendency to float on water. Moreover since these agents are readily wet by water they appear to act as what might be called water carriers or wetting agents. They separate the particles of flour and prevent the formation of lumps when water is added. In addition these agents, in spite of their weight, tend to stabilize the soya flour dispersions, provided they are sufficiently fine. This is especially true of minerals which are ground to colloidal dimensions. Colloidal clays, for example, have important stabilizing properties, as well as contributing to the dispersing properties of the soya flour. The dissolved preserving-dispersing agent cooperates both with the soya flour and the weighting agent since it wets the surface of the particles to a sufficient extent to prevent or retard segregation of these materials in storage.

The liquid preserving-dispersing agents which can be used in this invention are those which have wetting and vermin-repelling, as well as perserving properties. A considerable number of these agents are available. Any of these agents which are compatible with soya flour can be used in the mixture of the present invention.

A further component which enhances the dispersibility of the soya flour is water. We have found that water can be added to the described compositions in amounts up to about 45 per cent by weight without affecting their free-flowing and non-caking characteristics and that this water content substantially increases the speed with which the compositions can be dispersed, as well as increasing the stability of the resulting dispersions. It is evident, of course, that, in the absence of the preserving-dispersing agent of our invention, it would be impossible to market a soya flour containing any such quantity of water for the reason that bacteria and molds would quickly cause spoilage.

When a dry, untreated soya flour is mixed with water in the usual fashion, it tends to form in lumps which are sticky and tend to adhere to the agitator paddles. Even when added in small proportions the flour tends to float and it is very difficult to obtain a mixture which is free from sticky lumps and undispersed aggregates of flour particles. The length of time required to obtain a workable mixture is quite excessive. And if such preparations are employed as an adhesive, for example, it is frequently found that undispersed lumps produce inferior finished products. It is usually considered necessary to add caustic alkali to the water in order to obtain satisfactory dispersion of the soya flour. But for many purposes such caustic is highly objectionable in causing alkali staining and desizing.

The above described difficulties are entirely eliminated when use is made of the compositions of the present invention. The preserving-dispersing agent effectively separates the individual particles of flour and produces a wetting effect so that the flour particles can be readily wet with water. The water content of the flour appears to cause a preliminary swelling or deflocculation of the flour particles making them readily dispersible and increasing the stability of the resulting dispersions. The preserving dispersing agent also serves to hold particles of the weighting agent in contact with the separated flour particles so that the tendency of the flour to float is considerably reduced. The weighting agent separates the flour particles and assists in the wetting action. The result is that a smooth, homogeneous, stable dispersion can be obtained with a smaller proportion of flour and in a fraction of the time required in the case of the usual soya compositions. The soya flour, water, weighting agent and dispersing agent form a true combination, which affords a solution of the problem of obtaining quickly a homogeneous dispersion suitable for use as an adhesive or for other purposes.

The dispersing agent is preferably one which is soluble to at least some extent in both oil and water. Pine oil and sulfonated castor oil are good examples of such products. Among the other products which have been found satisfactory, the following may be mentioned: sodium alkyl aryl sulfonates, such as Nacconal (a solid sodium alkylaryl sulfonate), Activol (sodium salt of a dialkyl naphthalene sulfonate), Santomerse (dodecyl benzene sodium sulfonate), and Quaker Pro-so-Tex 75 (an alkylated aryl sulfonate); sulfonated higher phenols, such as Orthocen K (a sulfonated cresylic base compound), Aresklene (dibutyl phenyl phenol sodium disulfonate) and Beaconal A (mono ethyl phenol sodium monosulfonate); petroleum sulfonates, such as SP-717 (sodium petroleum sulfonate) and Stablex G (sodium salt of sulfonated petroleum hydrocarbons); sulfonated aryl alcohols, such as Titamine T. C. P. (sulfonated alcohol derivative), Maprofix (sulfonated cetyl alcohol) and Supersulfate F. S. Powder (sulfonated naphthenate fraction of petroleum containing an aromatic group); sulfolignins, such as Dilex (a purified sulfolignin); natural oils, such as pine oil and higher alkyl aryl sulfonates, such as Areskap (monobutyl phenyl phenol sodium monosulfonate). It will be noted that most of the chemicals in the above list are complex aryl compounds of sulfur-containing acids. Most of the materials in the above list have preserving and vermin-repelling properties and we prefer to employ dispersing agents of this character.

The weighting agent, as mentioned above, can be finely divided mineral matter which is compatible with aqueous dispersions of soya flour and which is substantially heavier than water. Examples of such materials are ferric oxide, lead chromate, red lead, clays, litharge, chrome yellow, barytes, lithopone, colloidal graphite, manganese dioxide, etc. These weighting agents can be used in proportions ranging from about 0.5 to 60 per cent, based on the weight of the composition as a whole.

Any of the usual soya flours can be employed in our invention. Some of these are defatted while others contain their natural oils. They usually contain from 40 to 53 per cent of vegetable protein. One flour which we have found to be particularly suitable for the manufacture of soya-silicate adhesives is known as SF#100 and is distributed by the Central Soya Company, Inc., of Chicago, Ill. Another is known as "Special Soybean Protein," sold by the Archer-Daniels-Midland Company of Minneapolis, Minnesota, and contains 53 per cent of protein. Another, from Sunsoy Products Limited of Toronto, Canada, contains 40% of protein. Such so-called high fat flours, which carry up to about 23% of natural oil, may be used.

Our novel compositions can be prepared in any suitable manner. If the two-component, soya-dispersant product is to be prepared, it is only necessary to mix the soya flour with the preserving-dispersing agent in any suitable mixing device. The flour can be added first to the mixer and then it is desirable to add the dispersant slowly while the agitator is operating. We find it advisable generally to dissolve solid preserving dispersants before adding them to the agitator, although this may not be essential. The time required for the mixing operation is considerably shortened if the preserving-dispersant is sprayed on the flour while the agitator is operating. After the preserving-dispersant and the flour have been thoroughly mixed, a mineral weighting agent can be added, either all at once or in several batches and thoroughly mixed in. It is desirable to mix the soya flour with the preserving-dispersing agent first, since it is the flour which is difficult to disperse and it is of advantage to mix thoroughly so that each particle of flour is separated. Any water to be incorporated can be added at any time during the mixing process. If a large quantity of weighting agent is employed, it is usually desirable to add this prior to the addition of the water, since the quantity of water used is preferably just below that required to form a damp mass which is not freely flowing. If added directly to the soya flour this quantity of water is likely to cause mixing difficulties. The mineral weighting agent alone can usually be mixed with only about 20 to 25 per cent of water without tending to agglomerate while the soya flour remains free flowing even though containing 40 to 45 per cent of water. It is thus seen that the permissible water content of our compositions varies with their content of weighting agent.

The quantity of mineral weighting agent to be employed depends upon what use is to be made of the soya preparation. If a soya-silicate-clay adhesive is to be made, for example, it is possible to add a colloidal clay in quantity somewhat exceeding the weight of the soya flour. We have found that, when these adhesives contain up to about equal parts of clay, their properties are actually improved by the clay content. A surprising result is that their working life is substantially increased and they are more stable and homogeneous that similar adhesives which contain no clay. The bonds produced are equally as strong and they show an equal retention of the glue line. When the proportion of clay is increased to about 5 parts of clay to 3 parts by weight of the soya flour, however, the bonds produced, while still satisfactory for most purposes, are somewhat weaker than those produced with similar adhesives containing smaller quantities of clay or free from clay. Other colloidal solids act in a similar manner. Of course, the greater the content of weighting agent, the more quickly the composition can be dispersed in water.

In one specific example of our composition we placed in a mixer 20 parts of "Special Soybean Protein." Then while the agitator was operating we sprayed in 1 part by weight of Turkey red oil. After this was thoroughly mixed in, we added 20 parts of colloidal clay and finally 20 parts of water. The resulting mixture could be dispersed in water in a fraction of the time required to disperse the soya flour in the absence of the weighting agent, dispersing agent and water. The dispersion was also satisfactorily stable. We have found this preparation particularly suitable for making clay-soya-silicate adhesives. For example, when 10 parts of the described mixture of soya flour, Turkey red oil, water and clay are mixed with 15 parts of water and 10 parts of "S" brand silicate of soda solution (having a ratio of $Na_2O$ to $SiO_2$ of 1:3.86 and containing 6.4 per cent of $Na_2O$), a highly satisfactory adhesive is produced. This adhesive, when used to combine paper board was found to produce bonds which, after soaking for 16 hours in water, gave a fiber tear over the entire surface and which, after drying, substantially recovered their dry strength. This adhesive was found to have an operating life of over 24 hours, which is at least double that of a similar adhesive made without a clay content.

In a second specific example we mixed together 97.5 parts of SF#100 soya flour, 2 parts of pine oil and 0.5 part of ferric oxide. This preparation was found to disperse satisfactorily in water, although not as rapidly or smoothly as the preparation of the preceding example. When one part of this composition is mixed with 4.3 parts of water, a satisfactory soya adhesive is formed which will not ferment for several days. Satisfactory water-free compositions can be made by following the directions given in the first example with the exception that the step of adding water is omitted.

In a third specific example we mixed together 30 parts of Soy Flake obtained from the above mentioned Sunsoy Products Limited, and one part of Orthocen K and 15 parts of clay. This was readily mixed with 70 parts of water and 100 parts of O Brand silicate of soda solution (having a ratio of $Na_2O:SiO_2$ of 1:3.22, and containing 9.1% $Na_2O$). A satisfactory adhesive was obtained.

While we have described what we consider to be the best embodiments of our dispersible soya compositions it is evident, of course, that many modifications can be made in the specific compositions which have been described without departing from the purview of this invention. While we have mentioned the fact that various weighting agents can be employed, best results are produced with those ground to colloidal dimensions. Thus, while ordinary high-grade clays, such as that called "Suprex," for example, can be employed, it is advantageous to employ clays of the bentonitic type. Ordinary soya flour contains from about 4 to 8 per cent of water. It requires at least about 5 per cent of additional water to produce an appreciable effect on the properties of our compositions, hence the water-containing compositions of our invention usually contain from about 9 to 45 per cent of water. If adhesives are to be made from our compositions, they should contain from about 2 to 15 per cent of soya protein. If silicate-soya adhesives are to be made, silicates can be employed which have ratios of $Na_2O$ to $SiO_2$ ranging from about 1:2 to 1:4. The proportions of soya protein to silicate can be varied rather widely. Of course our compositions are suitable for use for many purposes other than as adhesives. Other modifications of our invention which fall within the scope of the following claim will be immediately evident to those skilled in this art.

What we claim is:

A free-flowing, non-caking, readily-dispersing and caustic alkali-free composition of matter suitable for use as an adhesive when mixed with water, which comprises a soybean flour impregnated with from about 0.5 to 5 per cent by weight of a liquid preserving-dispersing agent, and containing from about 9 to 45 per cent of water and clay of substantially colloidal fineness in proportions ranging from about 0.5 to 60 per cent by weight.

CHESTER L. BAKER.
ROBERT H. SAMS.